United States Patent [19]

Bianchetta et al.

[11] 3,831,620
[45] Aug. 27, 1974

[54] VALVE DISABLING DEVICE
[75] Inventors: Donald L. Bianchetta, Coal City; Kenneth R. Lohbauer, Joliet, both of Ill.
[73] Assignee: Caterpillar Tractor Co., Peoria, Ill.
[22] Filed: Apr. 12, 1972
[21] Appl. No.: 243,396

[52] U.S. Cl. ............................ 137/269, 137/270
[51] Int. Cl. ...................... F16k 21/04, F16k 51/00
[58] Field of Search................... 137/269, 270, 271

[56] References Cited
UNITED STATES PATENTS
| 898,377 | 9/1908 | Karns | 137/271 |
| 2,959,390 | 11/1960 | Wyss | 251/43 |
| 2,993,677 | 7/1961 | Ford | 251/310 X |
| 3,026,896 | 3/1962 | Bosworth et al. | 137/270 |
| 3,416,561 | 12/1968 | Kokaly | 137/491 |

Primary Examiner—Irwin C. Cohen
Attorney, Agent, or Firm—Phillips, Moore, Weissenberger, Lempio & Strabala

[57] ABSTRACT

A valve disabling device for a fluid valve having a moveable control element operative for selectively controlling fluid communication through the valve comprises a disabling member disposed adjacent the control element and operative in a first position to permit normal movement of the control element and moveable to a second position to prevent normal movement of the control element.

3 Claims, 4 Drawing Figures

VALVE DISABLING DEVICE

BACKGROUND OF THE INVENTION

It is often necessary to disable or render inoperative a fluid control valve in a circuit so as to prevent inadvertent or undesirable operation of the valve. A particular problem arises when a fluid control circuit embodies a plurality of pressure responsive valves which are actuable in response to different predetermined pressure levels in the circuit. When it is desired to test or monitor the operating characteristics of those valves in the circuit opening at the higher pressures, it is necessary to disable or prevent the normal function of all pressure responsive valves in the circuit which are operable at a lower fluid pressure.

In the past, this has been accomplished by complicated and time-consuming disassembly of the valves and insertion of some valve function blocking element such as shim stock across a fluid passage to prevent such movement. This requires that the service personnel attempt to accumulate and store in their tool kits various members which are compatible with the numerous designs and sizes of pressure responsive valves which they may encounter in fluid control circuits.

This disassembly of the valve and introduction of a foreign element also presents a hazard of introducing dirt or other foreign material into a high pressure fluid circuit, with resultant damage to and possible failure of the circuit components.

SUMMARY OF THE INVENTION

Accordingly, it is the primary object of this invention to provide valve disabling means that overcomes the above problems of the prior art.

Another object of this invention is to provide a valve disabling device for a pressure responsive control valve that is selectively operative to prevent normal movement of a control element.

In accordance with a primary aspect of this invention, valve disabling means for a control valve is incorporated in the valve body adjacent the moveable valve element, and can be readily positioned in a first position to permit free operation of the valve and positioned in a second position to prevent operation of the valve.

Other objects and advantages of the present invention will become apparent from the following description when read in conjunction with the accompanying drawings.

DESCRIPTION OF THE PREFERRED EMBODIMENTS

Figure 1:
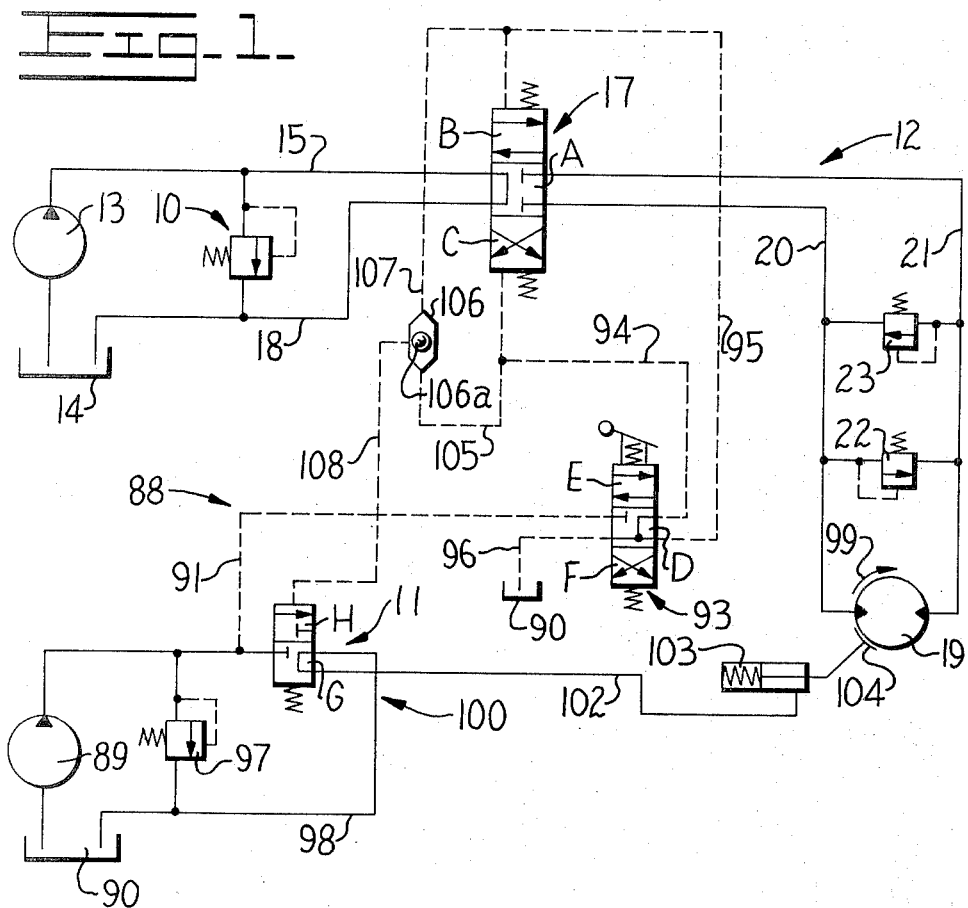
FIG. 1 is a schematic diagram of a fluid circuit utilizing valves embodying the principles of the present invention.

Referring more particularly to the drawings, a pair of fluid control valves embodying the principles of the present invention are generally indicated by the reference numerals 10 and 11 respectively and are schematically illustrated in FIG. 1 thereof as operatively incorporated in a fluid control circuit, generally designated by the reference numeral 12. Circuit 12 includes a pump 13, of any suitable type, adapted to draw hydraulic fluid from a reservoir 14 for supply through a line 15 to a control valve generally indicated at 17. The control valve is illustrated in this specific embodiment as being a three-position valve having a neutral or hold position designated "A", a first operative position designated "B", and a second operative position designated "C". A return line 18 communicates between the control valve and the reservoir 14 and with the valve 17 in the neutral position A as shown, the line 15 is in direct communication with the line 18 for return of the fluid output from the pump 13 to the reservoir.

Control valve 17 is connected for fluid communication with the opposite sides of a motor 19 by a pair of motor lines 20 and 21 in the usual manner. The motor lines are blocked when valve 17 is in the neutral A position. Accordingly, a pair of relief valves 22 and 23 are disposed in fluid communication controlling relation between the motor lines. Should motor 19 overrun due to gravitational or inertial effects of the load supported thereby and thus momentarily function as a pump, the appropriate one of relief valves 22 and 23 will open at a predetermined, relatively high pressure level to limit pressure in either of the motor lines and thus protect that portion of the circuit from damage due to overpressure conditions.

Figure 2:
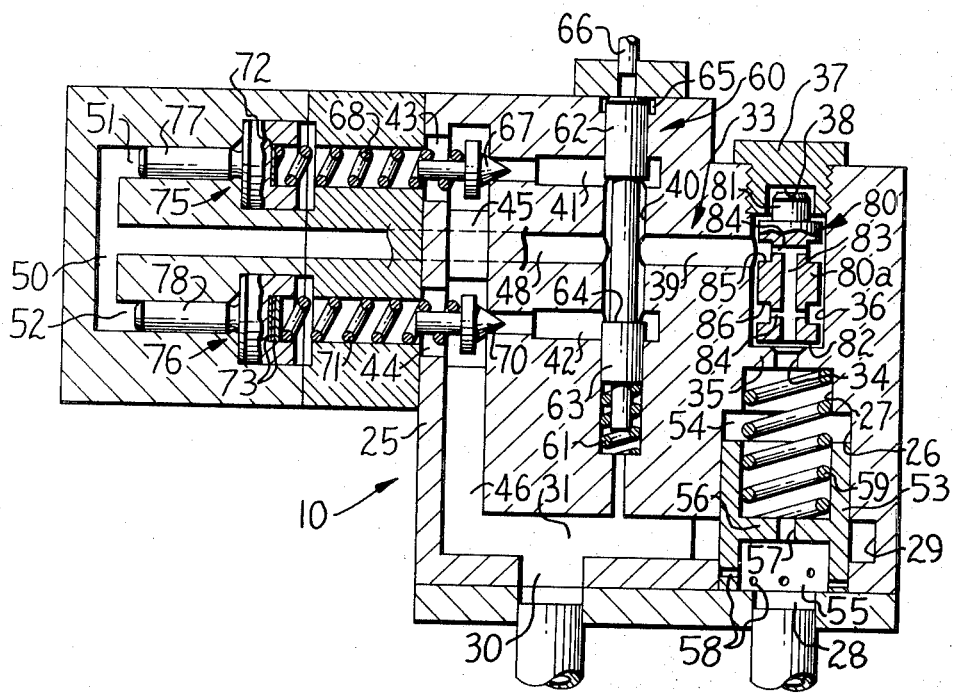
FIG. 2 is a longitudinal sectional view of one of the fluid control valves utilized in the circuit of FIG. 1.

Valve 10 is illustrated as a pilot operated relief valve and is disposed in fluid communication controlling relation between pump output line 15 and return line 18. As best shown in FIG. 2, valve 10 includes a body 25 which defines a stepped bore 26 therein including a spring receiving portion 27. The lower end of that stepped bore, as viewed in FIG. 2, has open communication with an inlet port 28.

An annular groove 29 is formed in body 25 in encircling relation to bore 26 and has open communication therewith. An outlet port 30 formed in the body communicates by way of a passage 31 with the annular groove 29.

The body 25 further defines a control passage indicated generally at 33 for communication between the bore 26 and the outlet passage 30. Control passage 33 includes passage 34 formed in a partition 35 for communication between the bore 26 and an elongated cavity 36 disposed in coaxially aligned longitudinally spaced relation to the bore 26.

A threaded plug 37 threadably engages the outer end of the cavity 36 to provide a removable closure therefor and includes an inwardly directed recess 38. A passage 39 provides fluid communication between the cavity and an elongated bore 40 at approximately the midpoint of the bore. A pair of substantially parallel passages 41 and 42 are individually and oppositely longitudinally spaced with respect to the passage 39 and provide communication between the bore 40 and a pair of fluid chambers 43 and 44. A passage 45 communicates between the chambers 43 and 44 which are commonly communicated with the outlet port 30 by way of a passage 46. A passage 48 disposed between passages 41 and 42 communicates the bore 39 with a cross passage 50 which in turn communicates with a pair of bores 51 and 52.

A dump spool 53 is reciprocably disposed in the bore 26 and forms therewith a control chamber 54 above the dump spool and an actuating chamber 55 disposed below the dump spool. The dump spool is generally "H"-shaped in cross section and includes a partition 56 between the control chamber and the actuating chamber. An orifice 57 through the partition provides restricted communication between the control chamber and the actuating chamber so as to normally equalize pressure in those chambers. The dump spool also includes a plurality of radial ports 58 which provide communication between the actuating chamber and groove 29 when the dump spool is moved upward to an open position.

A spring 59 is disposed in the control chamber 54 between the dump spool 53 and the partition 35 to urge the dump spool toward its closed position so as to block fluid communication between the inlet port 28 and the outlet port 30 by way of the annular groove 29 and the passage 31.

A selector valve stem 60 is reciprocably disposed in the bore 40 and is resiliently biased by a spring 61 toward an upward position communicating the passage 39 with the passages 41 and 42 by way of the bore 40. The selector valve stem includes a pair of lands 62 and 63 disposed at opposite ends thereof and a central groove 64 affords communication between the passage 39 and the passages 41 and 42. An actuating chamber 65 is formed at the upper end of the selector valve stem 60 and is adapted to receive pilot pressure by way of a pilot line 66 for powered downward movement of the selector valve stem.

A pilot poppet 67 is disposed in the chamber 43 and is resiliently biased by a spring 68 to a closed position normally blocking communication between the passage 41 and the chamber. A pilot poppet 70 is disposed in the chamber 44 and is resiliently biased to a closed position by a spring 71 to block communication between passage 42 and the chamber.

The force of springs 68 and 71 is regulated by a plurality of shims 72 and 73 respectively to predetermine pressure at which the poppets 67 and 70 will open. For example, a greater number of the shims 73 are provided behind the spring 71 so as to require a relatively higher pressure in the passage 42 for opening the poppet 70 than is required in the passage 41 for opening the poppet 67.

A pair of relief modulating pistons 75 and 76 are individually disposed in spring seating relation behind their respectively associated springs 68 and 71. Each of the modulating pistons has an actuating portion 77 and 78, respectively, individually projecting into the bores 51 and 52. The modulating pistons are adapted to change the bias of the springs as pressure in the system approaches the desired maximum value. This modulates opening of the poppets to prevent excessive pressure peaks and to quickly stabilize pressure in the system as is more fully disclosed and described in the U.S. Pat. No. 3,416,561 to Kokaly, assigned to the assignee of the present invention.

As previously described, the motor line relief valves 22 and 23 are adapted to open at a relatively higher pressure than the main circuit relief valve 10. With this arrangement, if it is necessary to check the response of the motor line relief valves at their predetermined opening pressure level, it is necessary to disable or render inoperative the main circuit relief valve 10.

For this purpose, a valve disabling device, generally indicated by the reference numeral 80, is incorporated into the valve body adjacent the valve element to be disabled. The valve disabling device comprises an elongated substantially cylindrical invertible body 80a disposed in a cavity 36, and includes a relatively small diameter blocking end 81 and a relatively larger diameter plug engaging end 82. Since the cavity 36 is formed as a portion of the control passage 33, it is necessary that the valve disabling device allow fluid communication between control chamber 54 and passage 39 when it is desired for valve 10 to be operative. For this purpose, the valve disabling device is substantially smaller in diameter than cavity 36 to provide a flow path therearound and further includes a central longitudinally drilled passage 83 and a plurality of axially spaced passages 84 radially extending therefrom for communication with a pair of correspondingly axially spaced annular grooves 85 and 86 in the body.

The recess 38 in the plug 37 opens into the cavity 36 and is considerably larger in diameter than the blocking end 81 of the valve disabling device 80. This permits the blocking end to project into the recess so as to prevent sealing engagement of the plug engaging end 82 of the invertible body with the partition 35 of the valve body 25.

The control valve 17 is adapted for pilot actuation and for this purpose a pilot control circuit indicated generally at 88 is provided. The pilot control circuit includes a pump 89 which draws fluid from a reservoir 90 for supply through a pump output line 91 to a pilot control valve 93 having a neutral position "D" and two operative positions "E" and "F". The pilot control valve is operative to provide communication of pilot pressure to opposite ends of the control valve by way of a pair of pilot lines 94 and 95. With the pilot valve in the neutral D position shown, the pilot lines are communicated by way of a line 96 to the reservoir 90. The pump line 91 is thereby blocked so that the pump output is returned to the reservoir by way of a pilot system relief valve 97 and a return line 98.

Movement of pilot valve 93 to its operative position E is effective to communicate the output line 91 of the pump 89 to the end of the control valve 17 connected to the pilot line 94. Under these conditions, the pilot line 95 is communicated to the reservoir by the return line 96 and the control valve is moved to its operative position C to drive the motor 19 in the direction indicated by an arrow 99. Movement of the pilot valve to its operative position F is effective to communicate the pump output line to the pilot line 95 and to connect the pilot line 94 to the reservoir to move valve 17 to its operative position B to drive the motor in a direction opposite to arrow 99.

Pump 89 also supplies a brake control circuit, indicated generally by the reference numeral 100, which includes the pressure responsive brake valve 11. With the brake valve in the blocking position G shown, pump output line 91 is blocked, and a brake line 102 communicating between the brake valve and a brake actuating cylinder 103 is communicated to the reservoir 90 by the return line 98.

The brake cylinder 103 is spring biased to the right, as viewed in FIG. 1, to engage a brake 104 operatively associated with the motor 19 for preventing rotation of the motor. Movement of valve 11 to its operative H position communicates the output line 91 of the pump 89 to cylinder 103 to release the brake and permit normal operation of the motor.

In order to insure automatic release of the brake 104, at any time control valve 17 is moved to one of its operative positions B or C, the brake valve 11 is pilot actuated by pressure in the pilot lines 94 and 95. For this purpose, a line 105 communicates between the pilot line 94 and one end of a shuttle valve or ball resolver 106 including a sliding ball 106a. A line 107 communicates between the pilot line 95 and the opposite end of the shuttle valve. A line 108 communicates from the central portion of the shuttle valve to an end of the brake valve, as viewed in FIG. 1, for selective operation of the brake valve to its brake disengaging position.

Figure 3:
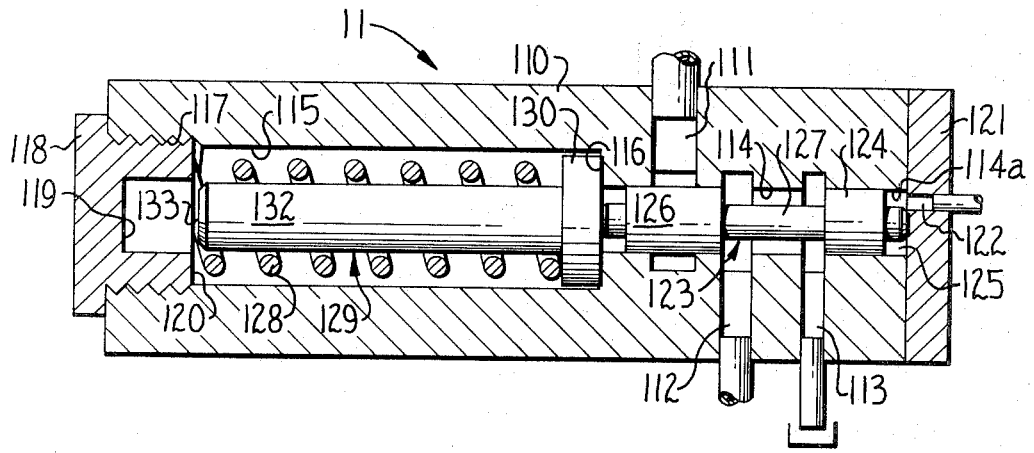
FIG. 3 is a longitudinal sectional view of an alternate form of fluid control valve as also utilized in the circuit of FIG. 1.

As best shown in FIG. 3, the brake valve 11 includes a body 110 having an inlet port 111, an outlet port 112 and a return port 113. Body 110 also has a relatively small diameter longitudinal valve bore 114 and a somewhat larger diameter control bore 115 coaxially aligned with the valve bore to define a shoulder 116 therebetween. An outer open end 117 of the control bore is normally closed by a threaded closure plug 118. The closure plug provides a recess 119 of a smaller diameter than the control bore so as to define a shoulder or stop 120 therebetween. The valve bore has an outer open end 114a closed by a cover 121 having a pilot port 122 therein for connection with the line 108. A brake control spool 123 is reciprocably disposed in the bore 114 and includes an outer land 124 which defines with the bore and the cover 120 an actuating chamber 125. The brake control spool further includes an inner land 126 and a relatively smaller diameter central portion 127 which cooperate with the outer land selectively to control communication between outlet port 112 and the inlet and return ports 111 and 113, respectively.

A spring retainer and pilot rod 129 is disposed entirely within the control bore and includes an enlarged head 130 which normally engages the shoulder 116. Since shoulder 116 defines the intersection of valve bore 114 and control bore 115, the enlarged head 130 of the spring retainer engages one end of control spool 123. A spring 128 is disposed within control bore 115 and has an end engaging the shoulder 120 and an opposite end engaging head 130. In this manner the spring is effective to urge the control spool to its brake engaged position, as shown, to communicate brake line 102 with return line 98 to vent the brake cylinder 103.

Spring retainer 129 further includes a spring pilot rod 132 which is smaller in diameter than enlarged head 130 and is substantially coextensive with spring 128 so that an end 133 is substantially radially aligned with shoulder 120 for a purpose hereinafter explained. The pilot rod is of a size slidably to be received in the recess 119 such that as the spool 123 is moved to the left, as viewed in FIG. 3, by compression of the spring 128 the pilot rod 132 moves into the recess to permit movement of the valve spool.

Figure 4:
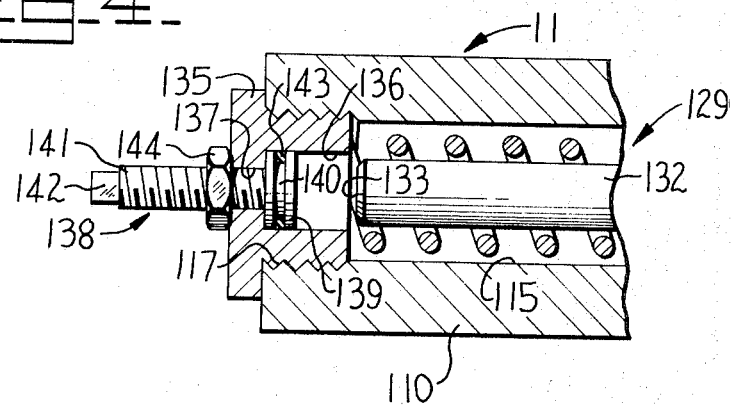
FIG. 4 is a fragmentary, longitudinal sectional view of the fluid control valve of FIG. 3 utilizing an alternate form of the present invention.

An alternate embodiment of a disabling device is illustrated in FIG. 4 as associated with the brake valve 11. In this embodiment a plug 135 includes a cylindrical recess 136 and a coaxial, intersecting threaded bore 137. An adjustable valve disabling device indicated generally at 138 includes an enlarged head 139 having a peripheral groove 140 and a threaded shank 141. The threaded shank has a driving end 142 and is threadably received in the bore 137 and is normally adjusted to a retracted position as shown such that the head 139 is disposed in the recess. A seal 143 disposed in the groove sealingly engages the recess to prevent leakage of fluid from the control bore 115. Frictional engagement of the seal with the recess will normally prevent unintentional rotation of the disabling device 138. However, a jam nut 144 may be provided on shank 141 to insure that a selected adjustment will be maintained. The plug is threadably engaged in the outer open end 117 of the control bore 114 in the body 110 such that the recess is axially aligned with the pilot rod 132 of the spring retainer 129.

OPERATION

While the operation of the present invention is believed clearly apparent from the foregoing description, further amplification will subsequently be made in the following brief summary of such operation. When it is desired to drive motor 19 in the direction of arrow 99, pilot valve 93 is manually positioned to the E position to communicate pilot pressure from the line 91 to the pilot line 94 to shift the control valve 17 to its operative position designated C. This communicates the output of the pump 13 by way of line 15 to the motor line 20 for driving the motor in the direction of the arrow. In order to permit operation of the motor 19, brake cylinder 103 must be pressurized to disengage the brake associated with the motor output. Pilot pressure in the pilot line 94 is communicated by way of line 105 to the shuttle valve 106 to move the ball 106a upward for communication with line 108. This shifts valve 11 to its brake disengaging position H by actuation of spool 123 to the left, as viewed in FIG. 3, to block communication between lines 98 and 102 and to establish communication between the pump output line 91 and the brake line 102.

With the brake disengaged, the motor 19 is free to rotate under the influence of fluid pressure in motor line 20 with the fluid discharged from the opposite side of the motor being returned to reservoir 14 by way of motor line 21 and return line 18. Driving of the motor in the opposite direction is accomplished by moving the valve 93 to its F position, as viewed in FIG. 1, to move valve 17 to the B position to communicate the pump with the motor through motor line 21 and to communicate motor line 20 with return line 18.

It is at times necessary or desirable to monitor the response of motor line relief valves 22 and 23 at a predetermined pressure level in motor lines 20 and 21 to determine if they are operating properly. Since the motor line relief valves are set to open at a somewhat higher pressure than does main circuit relief valve 10, it is necessary to render valve 10 inoperative momentarily to permit operation of the motor circuit at a somewhat higher pressure level. It is also desirable to prevent disengagement of the brake associated with the motor 19 so that the pressure in the motor circuit will increase to the predetermined level required to open either relief valve 22 or 23.

In order conveniently to accomplish such pressure monitoring, relief valve 10 is readily disabled by removing plug 37 as shown in FIG. 2, so that the valve disabling device 80 may be moved to a blocking position in the cavity 36. This is accomplished merely by inverting the valve disabling device in the cavity with blocking end 81 disposed downwardly in sealing engagement with passage 34. The plug 37 is then reinstalled so as to abut the plug engaging end 82 to maintain the disabling device in sealing contact with the passage 34. This blocks communication of control chamber 54 with the pilot poppets 67 and 70 so as to prevent normal operation of the relief valve by maintaining equalized pressure between the actuating chamber 55 and the control chamber 54. Under these conditions, the spring 59 holds the valve spool 53 in a closed position to prevent communication between the pump line 15 and the return line 18.

In order to disable the brake valve 11, the plug 118 is removed from the open end of the control bore 115 to permit reversal of the spring retainer and pilot 129. To accomplish this, the spring is installed in the control chamber first with the spring retainer then being inserted into the control bore so that the head portion 130 engages the outer end of the spring. The plug 118 is then reinstalled and since the head 130 is of substantially larger diameter than recess 119, the shoulder 120 will now engage head 130. Since the pilot portion 132 is substantially coextensive with the spring, the end 133 will be now disposed immediately adjacent the inner end of the spool 123.

With this arrangement, as pilot fluid is communicated by way of line 108 to the actuating chamber 125, movement of the spool 123 will be limited by engagement with the end 133 of the spring retainer 129 which now functions as a valve disabling device. This maintains the spool 123 in the position shown so that the brake cylinder 103 is vented to the reservoir 90 to prevent disengagement of the brake.

Under these conditions, actuation of the valve 17 to either of its operative positions communicates the output of pump 13 to the motor 19. Since the motor is locked against rotation by the now engaged brake associated therewith and the relief valve 10 is inoperative, the pressure in the system will continue to rise to the predetermined pressure level required to open the appropriate one of the motor relief valves 22 and 23. This permits monitoring of the pressure level in the circuit at which the motor line relief valves open by a pressure gauge or any other suitable means.

When it is desired to restore the circuit to its normal operative position, the disabling devices 80 and 129 are returned to the positions shown in FIGS. 2 and 3, respectively.

Disabling of valve 11 with the alternate embodiment of the adjustable disabling device 138 as shown in FIG. 4 is accomplished in the following manner. The jam nut 144 is loosened and the disabling device is threadably adjusted to an extended position so that the head 139 is in contact with the end 133 of the pilot rod 132. This blocks movement of the pilot rod into the recess 136 and thus prevents actuation of the spool of valve 11 to the brake disengaging position as previously described. The valve is restored to an operative condition by returning the disabling device to the retracted position shown.

In view of the foregoing, it is readily apparent that the structure of the present invention provides an improved fluid control valve which readily may be disabled to permit monitoring of the response of other valves in the circuit to relatively higher predetermined pressure levels. This is accomplished by the provision of a valve disabling device which is normally stored within a cavity in the valve so as to be readily available for use in disabling the valve. Since the cavity is completely closed during normal operation of the valve and disabling thereof is accomplished without the introduction of foreign objects or major disassembly, cleanliness of the system is enhanced.

While the invention has been described and shown with particular reference to the preferred embodiment, it will be apparent that variations might be possible that would fall within the scope of the present invention, which is not intended to be limited except as defined in the following claims.

What is claimed is:

1. A pressure responsive valve having disabling means incorporated therein, said valve comprising:
   a valve body defining an inlet and an outlet passage communicating with a cylindrical bore;
   a pressure responsive control valve element movably mounted in said cylindrical bore for controlling fluid communication between said passages;
   said valve element having an actuating chamber and a balance chamber including means providing restrictive communication therebetween, and vent passage means for venting said balance chamber to permit shifting of said valve element;
   means in said body forming a cavity adjacent said valve element and communicating with said vent passage means;
   elongated disabling means having a blocking end and a non-blocking end disposed in said cavity and operative in a first endwise position to provide passage means for permitting normal venting of said balance chamber and movement of said control valve element, and invertible to a second endwise position presenting said blocking end to block said vent passage means to prevent normal movement of said control elements; and,
   closure means removably secured to said body for receiving said blocking end when said disabling means is in said first position and for engaging said non-blocking end for holding said disabling means in said second position.

2. A pressure responsive valve having disabling means incorporated therein, said valve comprising:
   a valve body defining an inlet and an outlet passage communicating with a cylindrical bore;
   a pressure responsive control valve element movably mounted in said cylindrical bore for controlling fluid communicating between said passages;
   said valve element having an actuating chamber and a balance chamber including means providing restrictive communication therebetween, and vent passage means for venting said balance chamber to permit shifting of said valve element;
   means in said body forming a cavity adjacent said valve element and communicating with said vent passage means;
   a removable closure member for said cavity having a recess formed therein communicating with said cavity and stop means formed between said cavity and said recess;
   said closure member being removable to permit said disabling means to be inverted between said first and second positions;

said cavity is a cylindrical bore formed in said valve body and said recess is a cylindrical bore formed in said closure coaxial with said cavity; and, disabling means comprising a cylindrical member disposed in said cavity and having a blocking end receivable in said recess when said disabling means is in a non-blocking position and includes means for permitting normal venting of said balance chamber and said blocking end extending into said vent passage means when inverted to said second position, for blocking said vent passage means and said disabling means, having a stop engaging end which abuts said stop means when said disabling means is in said second position.

3. A pressure responsive valve having disabling means incorporated therein, said valve comprising:

a valve body defining an inlet and an outlet passage communicating with a cylindrical bore;

a pressure responsive control valve element movably mounted in said cylindrical bore for controlling fluid communication between said passages;

said valve element having an actuating chamber and a balance chamber, means providing communication between said chambers, and vent passage means for venting said balance chamber to permit shifting of said valve element;

means in said body forming a cavity adjacent said valve element and communicating with said vent passage means; and, said cavity is a cylindrical bore coaxially aligned with said valve bore and having an outward open end;

a closure member removably secured to said body in closing relation to said open end of said cavity and having a recess formed therein communicating with said cavity and forming a shoulder therebetween; and, disabling means comprising an elongated body having a blocking end receivable in said recess when said disabling means is disposed in an inoperative first position within said cavity and further including means for permitting normal venting of said balance chamber, and having a stop engaging end to engage said shoulder when said disabling means is inverted to an operative second position within said cavity so that said blocking end extends into and blocks said vent passage to render said valve inoperative by preventing axial movement of said control valve element in said valve bore.

* * * * *